US011347495B2

(12) United States Patent
Hayashidera

(10) Patent No.: US 11,347,495 B2
(45) Date of Patent: *May 31, 2022

(54) VEHICLE CONTROLLER, PROGRAM UPDATING METHOD, AND NON-TRANSITORY STORAGE MEDIUM THAT STORES PROGRAM FOR UPDATING PROGRAM

(71) Applicant: TOYOTA JIDOSHA KABUSHIKI KAISHA, Toyota (JP)

(72) Inventor: Akira Hayashidera, Nisshin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 0 days.

This patent is subject to a terminal disclaimer.

(21) Appl. No.: 17/009,214

(22) Filed: Sep. 1, 2020

(65) Prior Publication Data

US 2020/0394033 A1 Dec. 17, 2020

Related U.S. Application Data

(63) Continuation of application No. 16/259,033, filed on Jan. 28, 2019, now Pat. No. 10,795,661.

(30) Foreign Application Priority Data

Feb. 16, 2018 (JP) .............................. JP2018-026151

(51) Int. Cl.
*G06F 8/65* (2018.01)
*H04W 4/40* (2018.01)
(Continued)

(52) U.S. Cl.
CPC .............. *G06F 8/65* (2013.01); *B60R 16/023* (2013.01); *H04L 67/34* (2013.01); *H04W 4/40* (2018.02)

(58) Field of Classification Search
CPC .......... G06F 8/60; H04W 4/40; B60R 16/023; H04L 67/34
(Continued)

(56) References Cited

U.S. PATENT DOCUMENTS

| 4,787,040 A | 11/1988 | Ames et al. |
| 8,135,533 B2* | 3/2012 | Noda ................... G06F 11/1433 |
| | | 701/102 |

(Continued)

FOREIGN PATENT DOCUMENTS

| JP | 2003-122574 A | 4/2003 |
| JP | 2013-254264 A | 12/2013 |
| JP | 2016-060407 A | 4/2016 |

OTHER PUBLICATIONS

Li, Wei, Nan Li, and Zhengping Feng. "Upgrade of control system for a remotely operated vehicle." 2015 Sixth International Conference on Intelligent Control and Information Processing (ICICIP). IEEE, 2015.pp.448-452 (Year: 2015).*

(Continued)

*Primary Examiner* — Satish Rampuria
(74) *Attorney, Agent, or Firm* — Oliff PLC

(57) ABSTRACT

A vehicle controller includes: an execution unit configured to execute a control program for controlling a vehicle; a storage unit having a first program storage area to store the control program and a second program storage area to store an update program that is an updated version of the control program and created based on update data acquired from a device located outside the vehicle through a network; and an update unit that stores the update program in the second program storage area based on the update data, regardless of whether the execution unit is executing the control program.

13 Claims, 2 Drawing Sheets

(51) Int. Cl.
*H04L 29/08* (2006.01)
*B60R 16/023* (2006.01)
*H04L 67/00* (2022.01)

(58) Field of Classification Search
USPC .................................................. 717/168–178
See application file for complete search history.

(56) References Cited

U.S. PATENT DOCUMENTS

| | | | |
|---|---|---|---|
| 8,607,215 | B2 | 12/2013 | Natsume |
| 8,781,442 | B1* | 7/2014 | Link, II ................. H04L 9/3297 455/411 |
| 9,557,981 | B2* | 1/2017 | Throop ..................... G06F 8/61 |
| 9,916,151 | B2* | 3/2018 | Ye .......................... H04L 9/3247 |
| 10,231,273 | B2 | 3/2019 | Smith |
| 2003/0221049 | A1 | 11/2003 | Oguri et al. |
| 2004/0034861 | A1 | 2/2004 | Ballai |
| 2004/0078119 | A1 | 4/2004 | Luitje et al. |
| 2013/0326126 | A1 | 12/2013 | Kondoh |
| 2014/0068590 | A1* | 3/2014 | Natsume ................... G06F 8/65 717/170 |
| 2015/0301822 | A1 | 10/2015 | Takahashi et al. |
| 2018/0095745 | A1 | 4/2018 | Mine et al. |
| 2018/0152341 | A1 | 5/2018 | Maeda et al. |
| 2018/0218158 | A1* | 8/2018 | Amano ................... G06F 21/57 |
| 2019/0146779 | A1* | 5/2019 | Yasunori ................. B60R 16/03 717/168 |
| 2019/0258469 | A1* | 8/2019 | Hayashidera ......... B60R 16/023 |
| 2020/0310782 | A1* | 10/2020 | Ujiie ................... H04L 12/4625 |

OTHER PUBLICATIONS

Stevic, Stevan, et al. "IoT-based software update proposal for next generation automotive middleware stacks." 2018 IEEE 8th International Conference on Consumer Electronics—Berlin (ICCE—Berlin). IEEE, 2018.pp.1-4 (Year: 2018).*

Shi, Guoyong, et al. "A vehicle electric control unit over-the-air reprogramming system." 2015 International Conference on Connected Vehicles and Expo (ICCVE). IEEE, 2015.pp.48-51 (Year: 2015).*

Ryu, Hyun-Ki, et al. "The design of remote vehicle management system based on OMA DM protocol and AUTOSAR S/W architecture." 2008 International Conference on Advanced Language Processing and Web Information Technology. IEEE, 2008.pp. 393-397 (Year: 2008).*

Drolia, Utsav, et al. "Autoplug: An automotive test-bed for electronic controller unit testing and verification." 2011 14th International IEEE Conference on Intelligent Transportation Systems (ITSC). IEEE, 2011.pp. 1187-1192 (Year: 2011).*

Leung, Kevin K., et al. "A second generation micro-vehicle testbed for cooperative control and sensing strategies." 2007 American Control Conference. IEEE, 2007.pp. 1900-1907 (Year: 2007).*

Feb. 6, 2020 Office Action issued in U.S. Appl. No. 16/259,033.

Jun. 4, 2020 U.S. Notice of Allowance issued U.S. Appl. No. 16/259,033.

Y. S. Lee, J. H. Kim, H. V. Hung and J. W. Jeon, "A parallel re-programming method for in-vehicle gateway to save software update time," 2015 IEEE International Conference on Information and Automation, Lijiang, 2015, pp. 1497-1502. (Year: 2015).

Zhu Daowei and Xie Hui, "Control strategy optimization of the hybrid electric bus based on remote self-learning driving cycles," 2008 IEEE Vehicle Power and Propulsion Conference, Harbin, 2008, pp. 1-5. (Year: 2008).

R. Rout and B. Dubudhi, "NARMAX Self-Tuning COntroller for Line-of-Sight-Based Waypoint Tracking for an Autonomous Underwater Vehicle," In IEEE Transaction on Control Systems Technology, vol. 25, No. 4, pp. 1529-1536, Jul. 2017. (Year: 2017).

Nilsson, Dennis K., Lei SUn, and Tatuo Nakajima. "A framwork for self-verification of firmware updates over the air in vehicle ECUs." 2008 IEEEE Globecom Worksops. IEEE, 2008.pp. 1-5 (Year: 2008).

Nilsson, Dennis K., and Ulf E. Larson. "Secure firmware updates over the air in intelligent vehicles.," ICC Workshops—2008 IEEE International Conference on Communications Workshops. IEEE, 2008.pp. 380-384 (Year 2008).

Reschka, Andreas, et al. "Specifying a middleware for distributed embedded vehicle control systems.", 2014 IEEE International Conference on Vehiclular Electronics and Safety. IEEE, 2014.pp. 117-122 (Year: 2014).

* cited by examiner

VEHICLE CONTROLLER, PROGRAM UPDATING METHOD, AND NON-TRANSITORY STORAGE MEDIUM THAT STORES PROGRAM FOR UPDATING PROGRAM

This is a Continuation of application Ser. No. 16/259,033 filed Jan. 28, 2019, which in turn claims the benefit of Japanese Patent Application No. 2018-026151 filed on Feb. 16, 2018. The disclosure of the prior applications is hereby incorporated by reference herein in its entirety.

BACKGROUND

1. Field of the Disclosure

The present disclosure relates to a vehicle controller, a program updating method, and a non-transitory storage medium that stores a program for updating a program.

2. Description of Related Art

A vehicle is equipped with a plurality of controllers called electronic control units (ECUs) each having a storage unit and a control unit (processor), and the control units of the respective controllers execute programs stored in the storage units to perform various processes for vehicle control.

Such programs are sometimes updated to improve the functions or add a new function. Japanese Patent Application Publication No. 2016-60407 discloses a system in which program update data is downloaded to a mobile terminal via a network and the data is provided from the mobile terminal to a vehicle to rewrite and thereby update the program.

SUMMARY

In such a program updating system, a program is rewritten while the vehicle is stationary, for example, with the ignition switch off, since rewriting a program for an update while that program is being executed may cause a malfunction. Thus, there is a restriction on the execution timing of the program updating process.

The present disclosure provides a vehicle controller, a program updating method, and a non-transitory storage medium that stores a program for updating a program.

A first aspect of the present disclosure is a vehicle controller including: an execution unit configured to execute a control program for controlling a vehicle; a storage unit having a first program storage area configured to store the control program and a second program storage area configured to store an update program that is an updated version of the control program, the update program being created based on update data acquired from a device located outside the vehicle through a network; and an update unit configured to store the update program in the second program storage area based on the update data, regardless of whether the execution unit is executing the control program.

Thus, the update program can be stored even while the control program to be currently executed is being executed, which can ease the restriction on the execution timing of program rewriting and improve the convenience.

In the above aspect, the execution unit may be configured to perform first vehicle control based on an execution output of the control program and execute the update program; and the update unit may be configured to determine, based on an execution output of the update program, whether to switch from the first vehicle control to second vehicle control based on the execution output of the update program.

In the above configuration, the update unit may be configured to compare the execution output of the control program and the execution output of the update program, and determine whether to switch from the first vehicle control to the second vehicle control based on a comparison result.

In the above configuration, the update unit may be configured to determine, when the update unit verifies that a predetermined function has been realized by the update program, to switch from the first vehicle control to the second vehicle control.

In the above configuration, the execution unit may be configured to perform, when the update unit determines to switch from the first vehicle control to the second vehicle control, the second vehicle control.

According to the configuration, the update program is used for actual vehicle control after an operation based on the execution output of the update program is verified in each vehicle. The reliability of vehicle control can be maintained by thus not updating the program in the event that an intended function cannot be obtained.

In the above configuration, the update unit may be configured to delete, when the update unit determines to switch from the first vehicle control to the second vehicle control, the control program from the first program storage area by moving the update program from the second program storage area to the first program storage area so as to overwrite the first program storage area.

According to the configuration, a pre-update program that is no longer needed can be deleted to clear the storage area.

In the above configuration, a function of the execution unit may be configured to be executed by one or more processor cores of a plurality of processor cores included in one multi-core processor.

According to the configuration, processes in the execution unit can be concurrently executed in an efficient manner.

A second aspect of the present disclosure is a method of updating a program in a vehicle controller including: an execution unit configured to execute a control program for controlling a vehicle; a storage unit having a first program storage area configured to store the control program and a second program storage area configured to store an update program that is an updated version of the control program, the update program being created based on update data acquired from a device located outside the vehicle through a network; and an update unit (23) configured to perform a process of updating the control program. The method is executed by the update unit and comprising storing the update program in the second program storage area based on the update data, regardless of whether the execution unit is executing the control program.

A third aspect of the present disclosure is a non-transitory storage medium that stores a program for updating a program in a vehicle controller including: an execution unit that executes a control program for controlling a vehicle; a storage unit having a first program storage area to store the control program and a second program storage area to store an update program that is an updated version of the control program and created based on update data acquired from a device located outside the vehicle through a network; and an update unit that performs a process of updating the control program, the program for updating the program in the vehicle controller causing the update unit to store the update program in the second program storage area based on the update data, regardless of whether the execution unit is executing the control program.

According to the configurations, the update program can be stored even while the control program to be currently executed is being executed, which can ease the restriction on the execution timing of program rewriting and improve the convenience.

As has been described above, the present disclosure can provide a vehicle controller, a program updating method, and a program that can improve convenience by easing the restriction on the timing of program updating and that can also maintain reliability.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Overview

In a vehicle controller according to the present disclosure, an update program is stored in a storage area different from that of a control program being currently executed, which allows for the great convenience of being able to execute a process of storing the update program in the storage area even while the control program is being executed. The update program is executed for verification of an operation and is used for actual vehicle control when the operation is verified, so that the vehicle controller can maintain reliability.

EMBODIMENT

An embodiment of the present disclosure will be described below in detail with reference to the drawings.

Configuration

Figure 1:
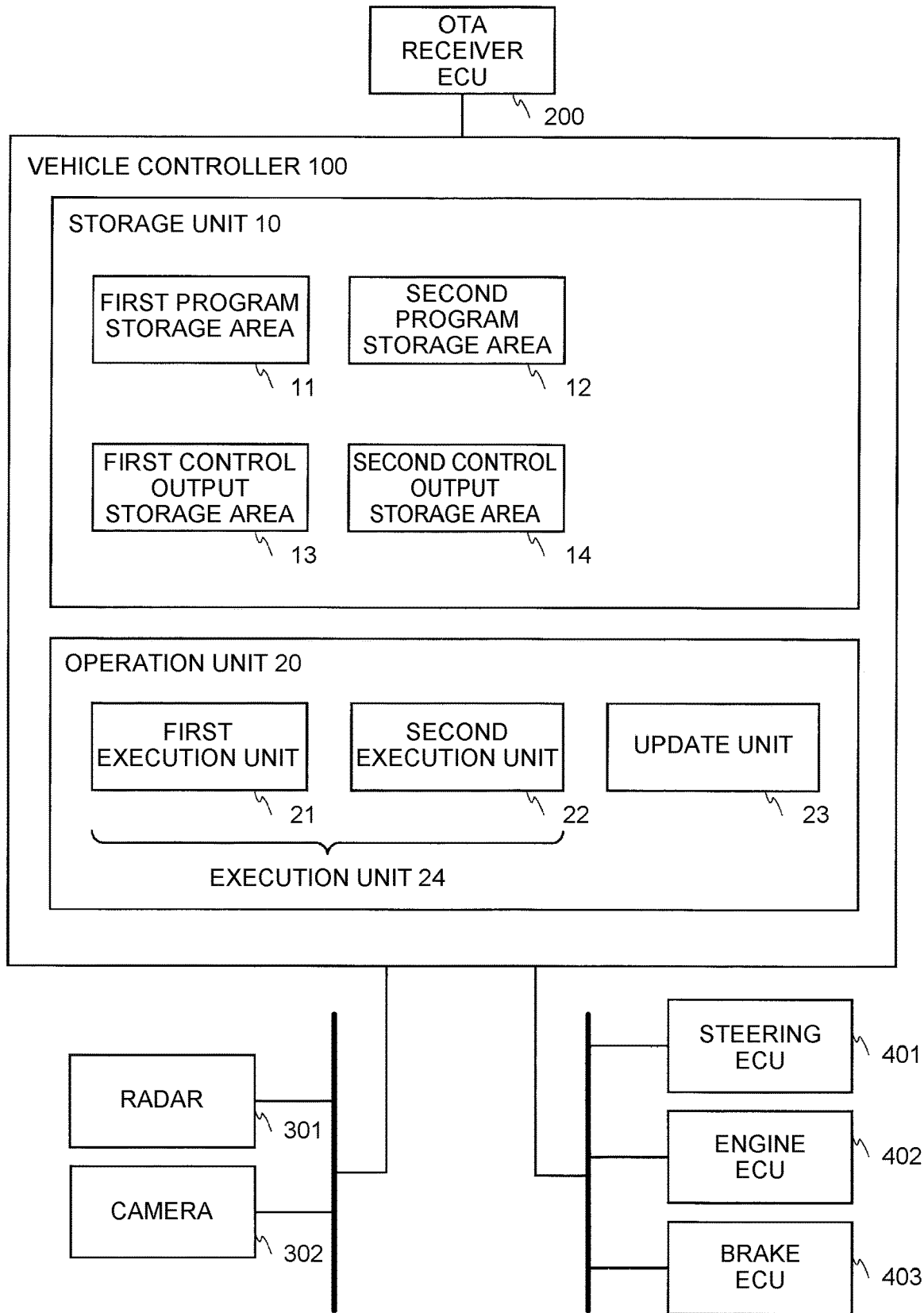
FIG. 1 is a functional block diagram of a vehicle controller and a peripheral part thereof according to an embodiment of the present disclosure.

FIG. 1 is a functional block diagram of a vehicle controller 100 and a peripheral part thereof in the embodiment. As an example, the vehicle controller 100 is an automatic driving ECU that controls automatic driving of a vehicle. The vehicle controller 100 includes a storage unit 10 and an operation unit 20. The operation unit 20 performs vehicle control, such as automatic driving control, by executing a program stored in the storage unit 10. Specifically, the operation unit 20 acquires conditions around the vehicle, such as the presence of an object, from sensors including a radar 301 and a camera 302 installed in the vehicle, and calculates a control output showing contents of vehicle control, such as steering, acceleration, and deceleration, based on the acquired conditions. The operation unit 20 then outputs the control output to a steering ECU 401, an engine ECU 402, a brake ECU 403, and the like and causes the ECUs to execute steering, acceleration, deceleration, etc. based on the control output. Moreover, the operation unit 20 acquires update data from an OTA receiver ECU 200 that receives update data from an off-vehicle server or the like through a network, and executes a process of updating the program stored in the storage unit 10 based on the acquired update data.

The operation unit 20 includes a first execution unit 21, a second execution unit 22 (the units will be collectively referred to as an execution unit 24), and an update unit 23. The units will be described later. While the configuration of the operation unit 20 is not limited, as an example, the operation unit 20 is a multi-core processor that is a CPU having a plurality of processor cores. The functions of the first execution unit 21, the second execution unit 22, and the update unit 23 may be realized by the same processor core that executes the functions while switching tasks, or may be realized by different processor cores that concurrently execute the functions. The update unit 23 may be a different CPU from the execution unit 24. By using a multi-core processor, a plurality of processes can be executed concurrently in an efficient manner.

The storage unit 10 has a first program storage area 11 (also referred to as "first bank," "first area" and "first memory"), a second program storage area 12 (also referred to as "second bank," "second area," "expanded memory" and "second memory"), a first control output storage area 13, and a second control output storage area 14. The areas will be described later. While the configuration of the storage unit 10 is not limited, as an example, the first program storage area 11 and the second program storage area 12 are formed by non-volatile flash ROM memories, and the first control output storage area 13 and the second control output storage area 14 are formed by volatile memories (RAM).

Figure 2:
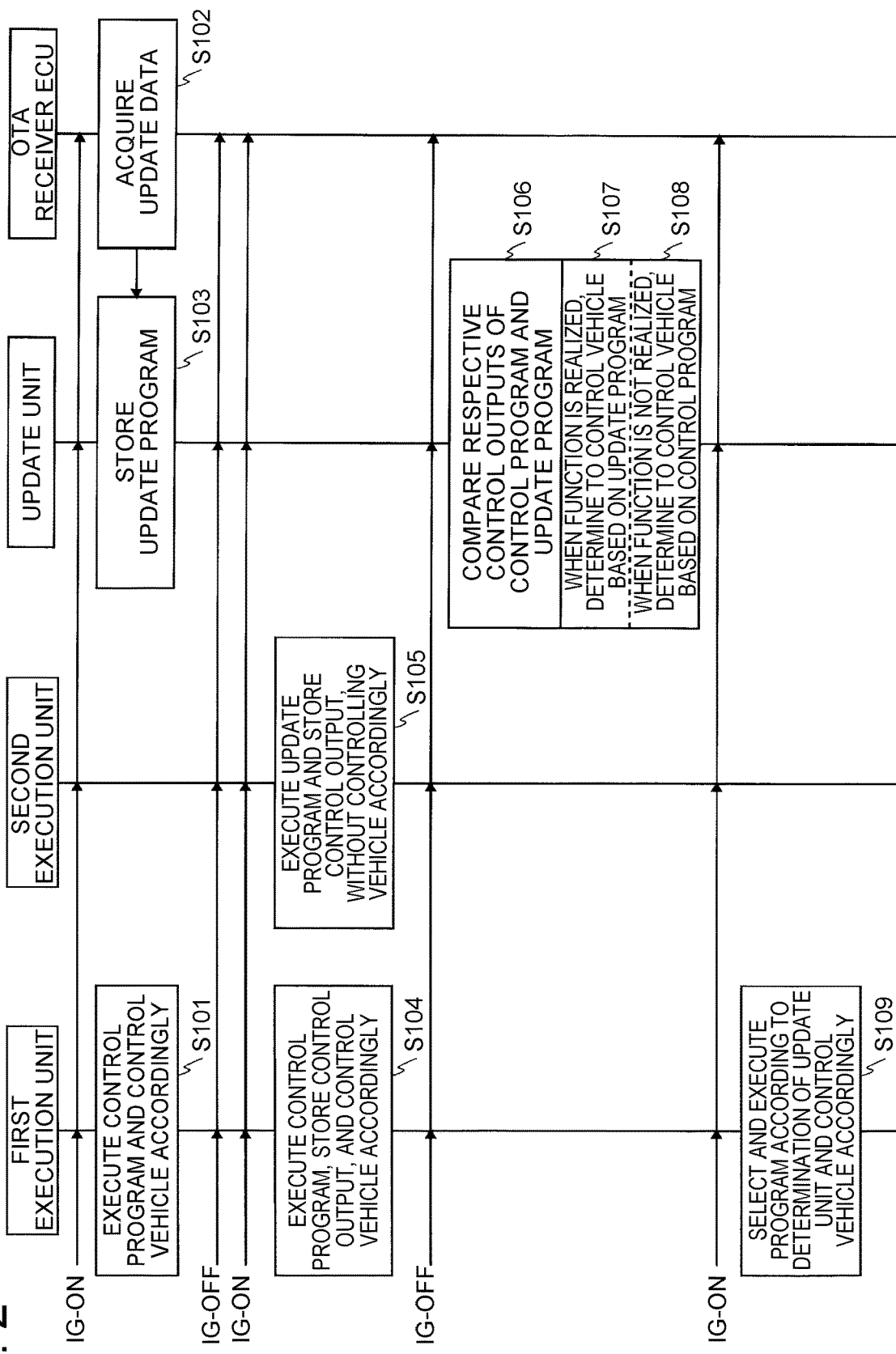
FIG. 2 is a sequence chart showing processes of the vehicle controller according to the embodiment of the present disclosure.

In the following, an example of a program updating process according to the embodiment will be described. FIG. 2 is a sequence chart illustrating the program updating process. The sequence is started, for example, when the ignition switch is turned on.

Step S101: The execution unit 24 performs the above-described vehicle control by executing a program stored in the storage unit 10. Here, the first execution unit 21 performs the vehicle control by executing a control program to be currently executed that is stored in the first program storage area 11, creating and outputting a control output, and controlling the ECUs accordingly.

Step S102: The OTA receiver ECU 200 acquires program update data. For example, the update data is received as a response from an off-vehicle server when the OTA receiver ECU 200 makes an inquiry to the server.

Step S103: The update unit 23 creates an update program based on the update data and stores the update program in the second program storage area 12. While the format of the update data is not limited, the update data may be, for example, difference data containing a part updated from the control program or may be compressed data of the difference data. In the case, the update unit 23 can store the update program in the second program storage area 12 by copying a part not to be updated of the control program from the first program storage area 11 to the second program storage area 12, creating an updated part based on the update data, and writing the updated part in the second program storage area 12. Alternatively, the update data may constitute the entire update program.

The process in step S101 and the processes in steps S102, S103 are executed concurrently and independently of each other. When the ignition switch is turned off during the processes, the process in step S101 is interrupted, but the processes in steps S102, S103 may be interrupted and may be continued. The processes in steps S102, S103 may be executed even when the process in step S101 is not being executed. If interrupted, the processes in steps S102, S103 are executed again when the ignition switch is turned on next time.

The following processes are executed when the above processes in steps S101, S102, S103 have been executed and the ignition switch has been once turned off and then turned on.

Step S104: The execution unit 24 performs the above-described vehicle control by executing the control program stored in the storage unit 10. Here, the first execution unit 21 executes the control program stored in the first program storage area 11, creates a control output as a program execution output, and outputs the control output to the ECUs to execute the vehicle control. The first execution unit 21 stores the control output in the first control output storage area 13.

Step S105: The execution unit 24 executes the update program stored in the storage unit 10. Here, the second execution unit 22 executes the update program stored in the second program storage area 12 and creates a control output as an execution output of the update program. The second execution unit 22 stores the control output in the second control output storage area 14. However, unlike the first execution unit 21 in step S104, the second execution unit 22 does not output the control output to the ECUs or execute the actual vehicle control. In steps S104, S105, the execution unit 24 can detect that the update program has been stored in the storage unit 10, by, for example, receiving notification from the update unit 23 or referring to the storage unit 10.

The above process in step S104 and process in step S105 are concurrently executed. When the ignition switch is turned off thereafter, the update unit 23 determines, based on the control output that is an execution output of the update program stored in the second control output storage area 14, whether to switch from the vehicle control based on the execution output of the control program that is currently performed, to the vehicle control based on the execution output of the update program. The determination process described in the following is an example and the determination process is not limited thereto. Step S106: The update unit 23 makes the above determination, for example, by verifying that the control output of the update program realizes an expected predetermined function. In the step, the update unit 23 compares the control output of the control program stored in the first control output storage area 13 and the control output of the update program stored in the second control output storage area 14. For example, in the case where a predetermined function expected of the update program is improvement of ride comfort, the predetermined function can be verified to be realized, when the control output of the update program indicates that the frequency of rapid steering, rapid acceleration, or rapid deceleration is equal to or lower than a predetermined value or indicates a lower frequency than the control output of the control program. A criterion for verifying such a predetermined function may be written in the update program or written in the control output of the update program so as to allow the update unit 23 to refer to the criterion. Alternatively, the update unit 23 may make the determination by using information from an acceleration sensor and the like installed in the vehicle.

Step S107: When the update unit 23 verifies that the predetermined function of the update program is realized, the update unit 23 determines to switch from the vehicle control based on the execution output of the control program that is currently performed, to the vehicle control based on the execution output of the update program. In the case, for example, the update unit 23 can clear the second program storage area 12 by moving the update program to the first program storage area 11 so as to overwrite the first program storage area 11 and delete the control program that is no longer needed. The update unit 23 may determine to switch to the vehicle control based on the execution output of the update program after verifying a predetermined multiple number of times that the predetermined function of the update program is realized, and the vehicle control based on the execution output of the control program may be performed until the determination is made.

Step S108: When the update unit 23 cannot verify that the predetermined function of the update program is realized, the update unit 23 determines to perform the vehicle control based on the execution output of the control program.

The following processes are performed when the above process in step S107 or S108 has been executed and the ignition switch has been turned on next time.

Step S109: According to the determination result of the update unit 23, the execution unit 24 selects either the update program or the control program as a program to be used for vehicle control, and performs vehicle control based on the execution output of the selected program. Here, as an example, the first execution unit 21 executes the program, creates and outputs a control output, and controls the ECUs accordingly. However, instead of the step, the processes in steps S105 to S108 are repeated, in the case where the update unit 23 verifies a predetermined multiple number of times whether the predetermined function of the update program is realized in step S107, and where the update unit 23 selects the control program as the program to be used for vehicle control because the predetermined multiple number of times has not yet been reached. When steps S105 to S108 are repeated a predetermined number of times and yet the update unit 23 cannot verify that the predetermined function of the update program is realized in step S107, the update unit 23 may stop verification and further delete the update program. This concludes the update sequence.

Advantages

In the above update sequence, an update program can be stored based on update data acquired from an external server (also referred to as a "center") even while a control program is being executed, which can ease the restriction on execution timing and improve the convenience.

Although update programs undergo a thorough quality check before being provided, the increasing sophistication and complication of driving support technology may in the future lead to a situation where update programs fail to fully exhibit expected functions under conditions where the characteristics of a vehicle or a road on which the vehicle is running, the driving characteristics of a user, etc. are peculiar and extreme. In the above update sequence, the update program is used for actual vehicle control after the update program is executed and realization of the predetermined function is verified case by case under the peculiar conditions surrounding each vehicle. The reliability of vehicle control can be maintained by thus not using the update program for vehicle control in the event that the intended function cannot be obtained by the update program.

The present disclosure can be regarded not only as a vehicle controller but also as a program updating method executed by a processor of a vehicle controller and as a program for updating a program.

The present disclosure is useful for vehicles and the like having an automatic driving function etc.

What is claimed is:

1. An electronic control unit for use with a vehicle, the electronic control unit comprising:
   a microcontroller configured to execute a software for controlling the vehicle; and
   a memory including:
      a first bank that stores the software, and
      a second bank that stores an update software that is an updated version of the software, the update software being based on update data that is acquired from outside the vehicle over a network, wherein:
   the microcontroller is configured to:
      execute the software while the update software is being written to the second bank,
   wherein the microcontroller is configured to start up with the update software when an ignition switch is turned on after writing the update software to the second bank and after a predetermined verification is established.

2. The electronic control unit according to claim 1, wherein
   the update data is acquired from a center located outside the vehicle, and
   the center is connected to the vehicle via the network.

3. The electronic control unit according to claim 1, wherein the first bank and the second bank are provided in a single flash memory.

4. An electronic control unit for use with a vehicle, the electronic control unit comprising:
   a microcontroller configured to execute a software for controlling the vehicle; and
   a memory including:
      a first area that stores the software, and
      a second area that stores an update software that is an updated version of the software, the update software being based on update data that is acquired from outside the vehicle over a network, wherein:
   the microcontroller is configured to:
      execute the software while the update software is being written to the second area,
   wherein the microcontroller is configured to start up with the update software when an ignition switch is turned on after writing the update software to the second area and after a predetermined verification is established.

5. The electronic control unit according to claim 4, wherein
   the update data is acquired from a center located outside the vehicle, and
   the center is connected to the vehicle via the network.

6. The electronic control unit according to claim 4, wherein the first area and the second area are provided in a single flash memory.

7. An electronic control unit for use with a vehicle, the electronic control unit comprising:
   a microcontroller configured to execute a software for controlling the vehicle; and
   a memory that stores the software, and
   an expanded memory that stores an update software that is an updated version of the software, the update software being based on update data that is acquired from outside the vehicle over a network, wherein:
   the microcontroller is configured to:
      execute the software while the update software is being written to the expanded memory,
   wherein the microcontroller is configured to start up with the update software when an ignition switch is turned on after writing the update software to the expanded memory and after a predetermined verification is established.

8. The electronic control unit according to claim 7, wherein
   the update data is acquired from a center located outside the vehicle, and
   the center is connected to the vehicle via the network.

9. The electronic control unit according to claim 7, wherein
   the memory corresponds to a first flash memory, and
   the expanded memory corresponds to a second flash memory that is different from the first flash memory.

10. An electronic control unit for use with a vehicle, the electronic control unit comprising:
    a microcontroller configured to execute a software for controlling the vehicle; and
    a first memory that stores the software, and
    a second memory that stores an update software that is an updated version of the software, the update software being based on update data that is acquired from outside the vehicle over a network, wherein:
    the microcontroller is configured to:
       execute the software while the update software is being written to the second memory,
    wherein the microcontroller is configured to start up with the update software when an ignition switch is turned on after writing the update software to the second memory and after a predetermined verification is established.

11. The electronic control unit according to claim 10, wherein
    the update data is acquired from a center located outside the vehicle, and
    the center is connected to the vehicle via the network.

12. The electronic control unit according to claim 10, wherein
    the first memory corresponds to a first flash memory, and
    the second memory corresponds to a second flash memory that is different from the first flash memory.

13. A vehicle controller comprising:
    a memory including:
       a first program storage area configured to store a control program for controlling a vehicle, and
       a second program storage area configured to store an update program that is an updated version of the control program, the update program being based on update data; and
    a processor programmed to
       perform a first vehicle control by executing the control program for controlling the vehicle,
       acquire the update data from a device located outside the vehicle via a network, and
       store the update program in the second program storage area, regardless of whether the execution unit is executing the control program,
    wherein the processor is configured to start up with the update program when an ignition switch is turned on after writing the update program to the second program storage area and after a predetermined verification is established.

* * * * *